P. G. LAGERBÄCK.
SOCKET FOR DRILLS WITH CONICAL SHAFTS.
APPLICATION FILED APR. 12, 1917.

1,227,632.

Patented May 29, 1917.

INVENTOR:
P. G. LAGERBÄCK
BY:
ATTORNEY.

UNITED STATES PATENT OFFICE.

PER GUSTAF LAGERBÄCK, OF SATTSJÖ-DUFNÄS, SWEDEN.

SOCKET FOR DRILLS WITH CONICAL SHAFTS.

1,227,632.     Specification of Letters Patent.     Patented May 29, 1917.

Application filed April 12, 1917. Serial No. 161,647.

*To all whom it may concern:*

Be it known that I, PER GUSTAF LAGERBÄCK, a subject of the King of Sweden, residing at Sattsjö-Dufnäs, in the Kingdom of Sweden, have invented new and useful Improvements in Sockets for Drills with Conical Shafts, of which the following is a specification, reference being had therein to the accompanying drawing.

This invention relates to an improvement in sockets for drills with conical shafts of that class, in which the drill is held by two or more laminæ, which are forced against the conical shaft of the drill by means of a sleeve, conical inside and movable longitudinally of the laminæ and the shaft of the drill. According to the invention balls are provided between the laminæ, one or more of which are free also at their inner ends, and the said sleeve in one circular row around the central line of the socket in order partially to reduce the friction between the sleeve and the laminæ partially to permit the free lamina or laminæ to adjust themselves in accordance to the conicity of the shaft of the drill.

Figure 1:
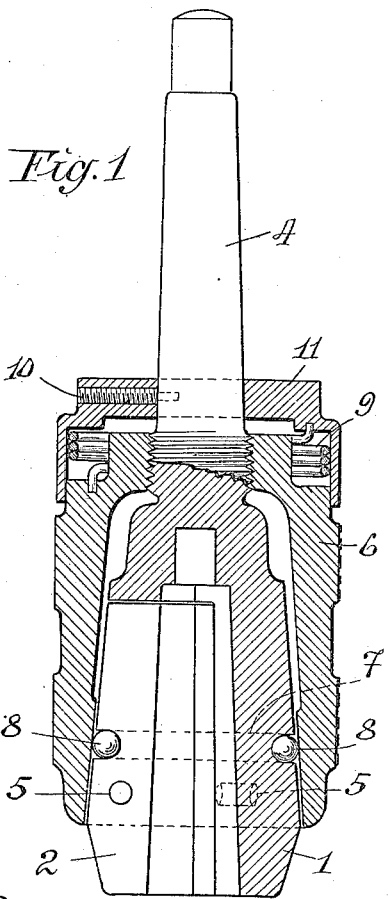
Figure 2:
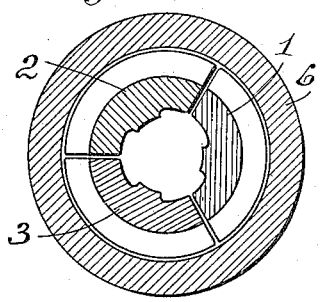
Figure 3:
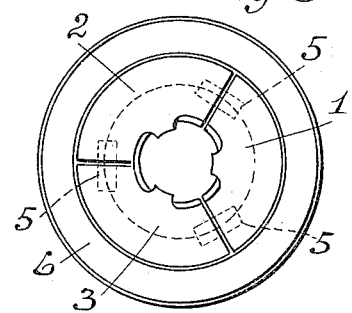

A drill-socket arranged in accordance with this invention is shown in the accompanying drawing, in a longitudinal section, Figure 1, and in a cross section, Fig. 2. Fig. 3 is an end view of the socket.

The drill-socket consists of two or more, in the drawing three, laminæ 1, 2, 3. One (1) of the said laminæ is connected with the spindle 4 of the socket or made integral with the same, while the laminæ 2, 3 are free. The said laminæ are freely connected with one another in the known manner by means of pins 5 located in transverse recesses provided in the laminæ. The said laminæ 1, 2, 3 are embraced by a sleeve 6, which is conical inside and is in screw-threaded engagement with the spindle 4, so that, as the sleeve and the spindle are rotated with relation to one another, the sleeve is moved in one or the other direction longitudinally of the socket and forces the laminæ against the shaft of the drill, located between the same, or releases the same. In order to reduce the friction between the sleeve and the laminæ a groove 7 is provided in the outer side of the laminæ, which extends around the socket and in which balls 8 are located in contact with the sleeve 6. The sleeve 6 actuates the laminæ only at the said balls. According to the invention there is only one row of balls between the sleeve 6 and the laminæ, which results in the advantage that, at the same time as the friction between the sleeve and the laminæ is reduced, the free laminæ 2, 3 can oscillate for some extent transversally on the balls respectively and thus adjust themselves to the conicity of different drill shafts.

One end of a spiral spring 9 is connected with the sleeve 6, while the other end of the spring is connected with a ring 11, fixed to the spindle 4 by means of a screw 10 or the like. The object of the said spring 9 is to prevent the sleeve 6 from getting loose during the operation of the drill. The outer side of the sleeve 6 is fluted or arranged in any other suitable manner, so that it can be firmly grasped with the hand. For the disengaging of the drill, while the spindle rotates, one grasps the sleeve 6 and holds the same. The sleeve is then moved longitudinally of the spindle, so that the path of the balls 8 at the sleeve 6 grows wider and the laminæ are permitted to retire from one another, in consequence whereof the drill becomes free and may be removed. If the drilling machine is at a standstill the sleeve 6 must only be rotated for the gaining of the said object.

Having now described my invention, what I claim as new and desire to secure by Letters Patent is:

In a socket for drills with conical shafts the combination of laminæ, one or more of which are free, a sleeve for tightening the laminæ around the shaft of the drill and one row of balls located between the laminæ and the said sleeve, substantially as described and for the purpose set forth.

In witness whereof, I have hereunto signed my name.

PER GUSTAF LAGERBÄCK.

Copies of this patent may be obtained for five cents each, by addressing the "Commissioner of Patents, Washington, D. C."